(12) United States Patent
Carr et al.

(10) Patent No.: US 9,684,435 B2
(45) Date of Patent: Jun. 20, 2017

(54) CAMERA SELECTION INTERFACE FOR PRODUCING A MEDIA PRESENTATION

(71) Applicant: Disney Enterprises, Inc., Burbank, CA (US)

(72) Inventors: George Peter Carr, Pittsburgh, PA (US); Yaser Sheikh, Pittsburgh, PA (US); Eric Ronald Foote, Swissvale, PA (US); Patrick Joseph Lucey, Pittsburgh, PA (US); Iain Matthews, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 447 days.

(21) Appl. No.: 14/153,753

(22) Filed: Jan. 13, 2014

(65) Prior Publication Data

US 2015/0201134 A1     Jul. 16, 2015

(51) Int. Cl.
  *H04N 21/2187* (2011.01)
  *G06F 3/0484* (2013.01)
  *H04N 21/218* (2011.01)
  *H04N 21/454* (2011.01)
  *G11B 27/031* (2006.01)
  *G11B 27/34* (2006.01)
  *H04N 5/232* (2006.01)
  *H04N 5/262* (2006.01)

(52) U.S. Cl.
  CPC ........ *G06F 3/04842* (2013.01); *G11B 27/031* (2013.01); *G11B 27/34* (2013.01); *H04N 5/23206* (2013.01); *H04N 5/23216* (2013.01); *H04N 5/23293* (2013.01); *H04N 5/23296* (2013.01); *H04N 5/262* (2013.01); *H04N 5/2624* (2013.01); *H04N 21/2187* (2013.01); *H04N 21/21805* (2013.01); *H04N 21/454* (2013.01)

(58) Field of Classification Search
  None
  See application file for complete search history.

(56) References Cited

U.S. PATENT DOCUMENTS

| 5,182,641 | A | * | 1/1993 | Diner | H04N 7/181 348/113 |
| 5,212,637 | A | * | 5/1993 | Saxena | G06F 19/321 382/132 |
| 2002/0008758 | A1 | * | 1/2002 | Broemmelsiek | G01S 3/7864 348/143 |

(Continued)

*Primary Examiner* — Jay Patel
*Assistant Examiner* — Shadan E Haghani
(74) *Attorney, Agent, or Firm* — Patterson + Sheridan, LLP

(57) ABSTRACT

To generate a media presentation of a live event, a user interface is coupled to at least three cameras that share substantially the same vantage point. One of the cameras (e.g., a context camera) provides a context view of the event that is displayed on a screen of the user interface. The views of the other two cameras are superimposed onto the context view to define sub-portions that are visually demarcated within the context view. Based on user interaction, the user interface can switch between the cameras views and control the cameras to capture different portions of the context view. Based the image data captured by the views of the cameras within the context view, the user interface generates a media presentation that may be broadcast to multiple viewers.

20 Claims, 7 Drawing Sheets

(56) References Cited

U.S. PATENT DOCUMENTS

| | | | | |
|---|---|---|---|---|
| 2002/0067412 A1* | 6/2002 | Kawai | ............... | H04N 5/232 |
| | | | | 348/211.99 |
| 2003/0210329 A1* | 11/2003 | Aagaard | ............ | H04N 7/181 |
| | | | | 348/159 |
| 2011/0058036 A1* | 3/2011 | Metzger | ............ | H04N 7/181 |
| | | | | 348/143 |

* cited by examiner

US 9,684,435 B2

CAMERA SELECTION INTERFACE FOR PRODUCING A MEDIA PRESENTATION

BACKGROUND

Field of the Invention

Embodiments presented in this disclosure relate to generating a media presentation using a plurality of cameras, and more specifically, to using a user interface to control the orientation of the cameras and select which camera is currently broadcasting the media presentation.

Description of the Related Art

Many live broadcasts require a coordinated team of camera operators, directors, and technical personnel to control and switch between multiple cameras. One example of a live broadcast that uses multiple cameras is a sporting event. There, the cameras are typically operated by respective camera operators who focus on their viewfinder to ensure they capture a well composed shot while their periphery vision provides the operators with context on how the play is unfolding and permits them to follow the action. A director relies on a bank of live monitors in a control room to select a series of camera angles to best focus on what is happening in the game. The director may be in continual dialogue with the camera operators to get particular shots which help place the action in context desired by the director. Thus, for high-quality live broadcast to be obtained, the communication and understanding of instruction between the director and camera operators must be explicit and clear which is more difficult to achieve with an inexperienced team.

SUMMARY

One embodiment presented herein is method and computer program product for generating a media presentation. The method and computer program product include displaying a context view of a live event on a screen and correlating a view captured by a first camera to the context view in the screen, where the view captured by the first camera is visually demarcated as first sub-portion of the context view. The method and computer program product also include transmitting, based on received user input, a command to adjust the view captured by the first camera, thereby moving the first sub-portion corresponding to the view captured by the first camera to a different location in the context view. The method and computer program product includes correlating a view captured by a second camera to the context view, where the view captured by the second camera is a second sub-portion of the context view. Upon receiving a predefined user input, the method and computer program product switch from visually demarcating the first sub-portion to visually demarcating the second sub-portion of the context view on the screen. In addition, the method and computer program product include outputting the first and second sub-portions to generate a media presentation of the live event.

Another embodiment described herein is a user interface that includes a connection interface configured to couple to a first controllable camera, a second controllable, and a context camera. The user interface also includes a display screen and a processing element where the processing element is configured to receive and display a context view captured by the context camera of a live event on the display screen, correlate a view captured by the first camera to the context view in the screen, and visually demarcate on the display screen the view captured by the first camera as first sub-portion of the context view. The processing element is further configured to transmit, based on received user input, a command to first camera to adjust the view captured by the first camera, thereby moving the first sub-portion to a different location in the context view. The processing element is configured to correlate a view captured by a second camera to the context view, where the view captured by the second camera is a second sub-portion of the context view and, upon receiving a predefined user input, switch from visually demarcating the first sub-portion to visually demarcating the second sub-portion of the context view on the display screen. The processing element is also configured to output the first and second sub-portions to generate a media presentation of the live event.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
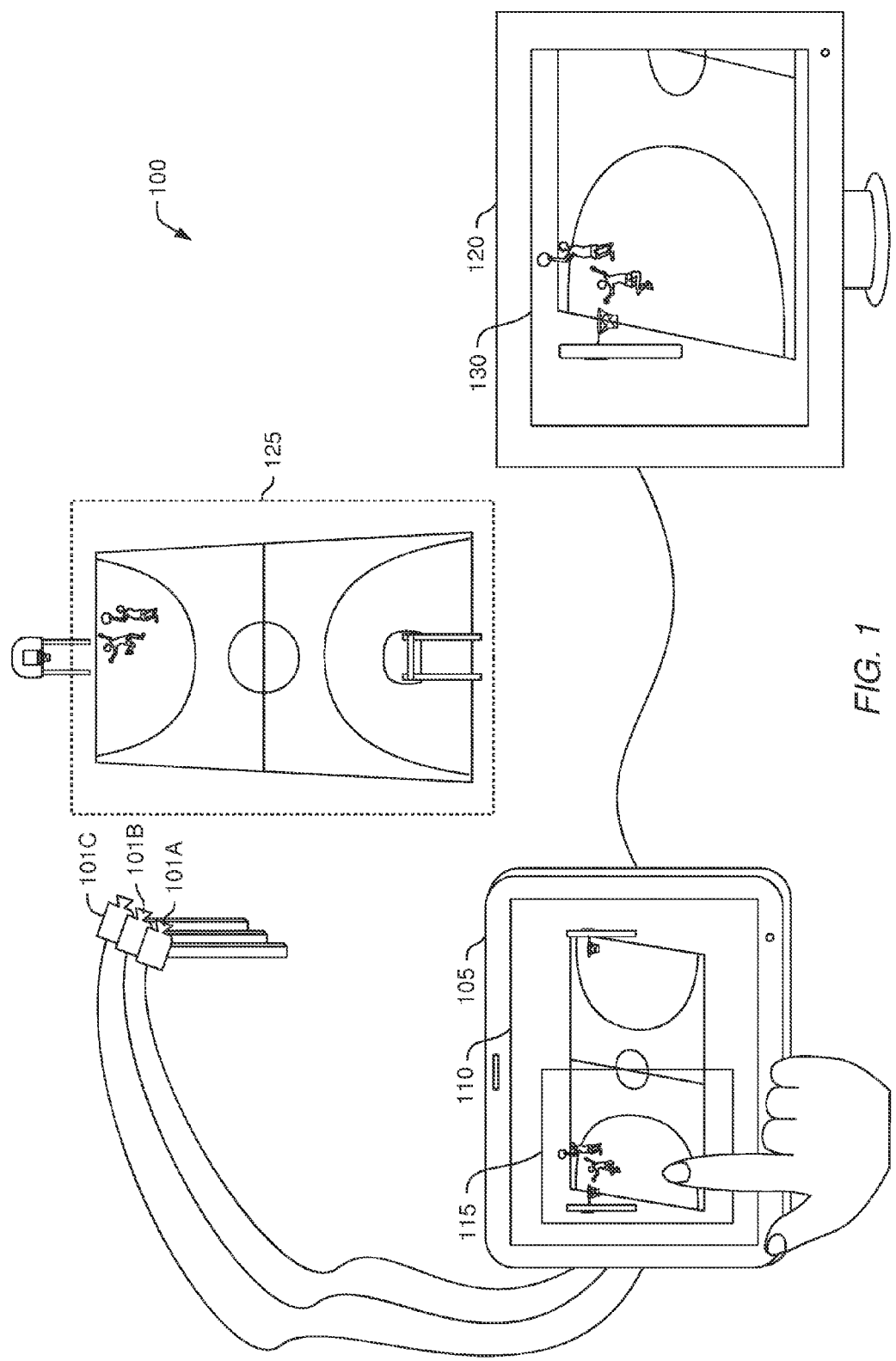
FIG. 1 illustrates a system for controlling multiple cameras using a user interface, according to one embodiment presented herein.

In embodiments described herein, a user interface is coupled to a plurality of controllable cameras that permit a user to control and switch between the cameras to generate a media presentation of a live event. For instance, the user interface may display a context view that defines a viewable area. In one embodiment, the context view may be the image data captured by a fixed, wide-angle camera. The user interface may superimpose onto the context view a view captured by a first one of the plurality of controllable cameras. More specifically, the view of the first camera may be a sub-portion of the view captured by the fixed camera that provides the context view. The view of the first camera may be demarcated within the displayed context view using, for example, a colored boundary. Using an input device or a touch sensitive region of the user interface, the user may move the first camera view within the displayed context view. In response, the user interface sends commands that adjust the view of the first camera (e.g., a pan-tilt-zoom (PTZ) camera). The user interface uses the view captured by the first camera to generate the media presentation, e.g., a television broadcast of a live event. In this manner, the portion of the context view outside of the demarcated view of the first camera provides the user with context (e.g., activities that are outside of the view of the first camera) that the user can use to decide how to adjust the first camera. For example, if an activity the user deems interesting is occurring within the context view but outside the view of the first camera, the user can move the view of the first camera within the context view so the activity is added to the media presentation.

The user may also send instructions to the user interface to switch from the first camera to a second controllable camera. Instead of displaying the view of the first camera, the user interface displays the view of the second camera within the context view. This permits the user to switch and control multiple cameras for generating the media presentation. For example, the two cameras may have two different zooms where the first camera captures a larger view than the second camera. For instance, when a basketball player dribbles a ball up the court, the user may select the camera that provides the wider viewing angle, but when the player drives to the basket, the user may switch to the camera that provides a narrow view for better viewing of the action. In one embodiment, once the user switches between displaying the different views of the cameras, the user interface automatically uses the view of the switched to camera to generate the media presentation. Alternatively, the user interface may permit a user to switch between which camera view is demarcated within the context view without automatically switching the input to the media presentation. In this scenario, the user may use two different instructions: one for switching between the camera views and another for instructing the user interface which camera view to use when generating the media presentation.

Like with the first camera, the user interface may superimpose the view of the second camera onto the context view. The user can then use an input device or a touch sensitive region to adjust the second camera (e.g., a PTZ camera) thereby moving the view of the second camera within the context view. The user may then switch back to the view of first camera when desired. In this manner, the user interface permits a single user to control the views of multiple cameras and determine which camera view is used to generate the media presentation.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a system 100 for controlling multiple cameras 101A-C using a user interface 105, according to one embodiment presented herein. As shown, system 100 includes cameras 101 which may be arranged to capture all of, or portions of, the viewable area 125. The image data captured by the cameras 101 is communicated to the user interface 105 using either wired or wireless techniques. As used throughout this disclosure, the figures and the described embodiments use a sporting event as an example of a viewable area 125 but the disclosure is not limited to such. The viewable area may be a musical concert, meeting, speech, or other live event that takes place indoors or outdoors.

The user interface 105 receives the image data from the cameras 101 and provides a user with the necessary tools to control one or more of the cameras in order to generate a media presentation of the event (e.g., a live broadcast such as TV or Internet broadcast or a time-delayed presentation such as a film). Instead of using respective camera operators for controlling each of the cameras and a director for selecting which of the cameras is currently being used to generate the media presentation, the user interface 105 permits a single user to perform the same function. To do so, interface 105 includes a display 110 that outputs the image data captured by the cameras 101. In the embodiment shown, camera 101A is a context camera that defines the total viewable area 125. The image data captured by context camera 101A is then outputted onto the display 105. In one embodiment, the context view output by the camera 101A may cover the entire viewable area of display 105. Further still, the context camera 101A may be fixed such that the user does not (or cannot) move the camera 101A and change its viewable area.

Portion 115 of the context view represents a view of one of the controllable cameras 101B or 101C that is superimposed onto, or correlated with, the context view. The view defined by portion 115 may be the image data used by the user interface 105 to generate the media presentation. That is, the user viewing the display 110 sees the context view which includes other activities of the event outside of portion 115 which may not be included in the media presentation. The user interface 105 may transmit the image data in portion 115 to device 120 which may be coupled to the user interface 105 via a cable, a television broadcast network, the Internet, and the like. As such, the device 120 may be any device with a screen 130 such as a television, projector, or a computing device such as a smartphone, laptop, desktop, tablet and the like. As shown in FIG. 1, only the portion 115 of the context view is displayed on the device 120 while the rest is not.

In one embodiment, display 110 on the user interface 105 may be touch sensitive so that a user can use predefined gestures to control the cameras 101B and 101C and thus the portion of the context view used to generate the media presentation. For example, portion 115 may be divided from the rest of the context view using a demarcation such as a color boundary, highlighting, and the like. Using a finger or stylus, the user may drag the demarcated portion 115 such that a different portion of the context view is within the portion 115. To do so, the user interface 105 sends commands that adjust the position of the corresponding camera 101 whose view is currently shown in portion 115, thereby changing the position of portion 115 within the context view. As the user moves the demarcated portion 115 to a different location within the context view, the media presentation changes accordingly. In this manner, the user can control which portion of the viewable area 125 she wishes to broadcast to the device 120. Instead of using a touch-sensitive display 110, in other embodiments, the user interface 105 may include a joystick or track user eye gaze in order to move the demarcated portion 115 to a different location within the context view.

Additionally, the user interface 105 may permit the user to control the zoom of the controllable cameras thereby changing the size or area of the demarcated portion 115 in the context image. That is, zooming in reduces the size of the portion 115 while zooming the camera out increases its size. If a touch-sensitive display is used, the user may make a gesture that changes the zoom. For example, the user may bring two fingers contacting the display 110 closer together to zoom out and separate the fingers to zoom out. Alternatively, the display 110 may include a virtual slider bar that the user can either touch or interact with using a mouse or trackball that controls the zoom of the currently selected camera. In this example, the user may use one hand to move the portion 115 around the context view and use the other hand to control zoom.

In one embodiment, the rest of the context view not in portion 115 may be deemphasized so the user can easily focus on portion 115. For example, the user interface 105 may defocus the portion of the context view outside portion 115 so that it appears fuzzy. Alternatively, the user interface 105 may use different color schemes so the image data in portion 115 is brighter and more noticeable than the surrounding image data.

As will be discussed later, the user can change which camera view is superimposed on the user interface 105. Although two controllable cameras 101B and 101C are shown, the system 100 may include any number of cameras 101 that can be controlled by a single user interacting with the user interface 105.

In one embodiment, the cameras 101 may be preconfigured to permit the views of the controllable cameras 101B and 101C to be superimposed onto the view of the context camera 101A. If a fish eye camera is used as the context camera 101A, the images captured by the controllable cameras 101 may be mapped on to the surface of a sphere which is then displayed on the display 110 by plotting the composited image as a function of spherical angles. For instance, the image is mapped to the sphere by interpolating over the number of pixels in the display 110 and associating every pixel location with a 3D point on the surface of the unit sphere. The 3D points are projected into each of the cameras 101 to determine appropriate sampling locations for image interpolation. The 3D coordinates are then transformed from the coordinate system of the unit sphere to the coordinate system of each camera to generate respective conversion matrices which can be used to superimpose the images captured by the controllable cameras 101B and 101C onto the image captured by the context camera 101A. This is just one technique for configuring the cameras 101. This disclosure, however, is not reliant on any particular technique for configuring multiple cameras.

Furthermore, the cameras 101 may share substantially the same vantage point. That is, the cameras 101 may be located proximate to each other such that the image data captured by the controllable cameras 101B and 101C can be superimposed on the image data captured by the context camera 101A. For example, the further away the activity of interest, the further spaced the cameras 101 can be and still be located at the same vantage point. In one embodiment, the cameras 101 may be mounted on the same physical structure but this is not a requirement.

Figure 2:
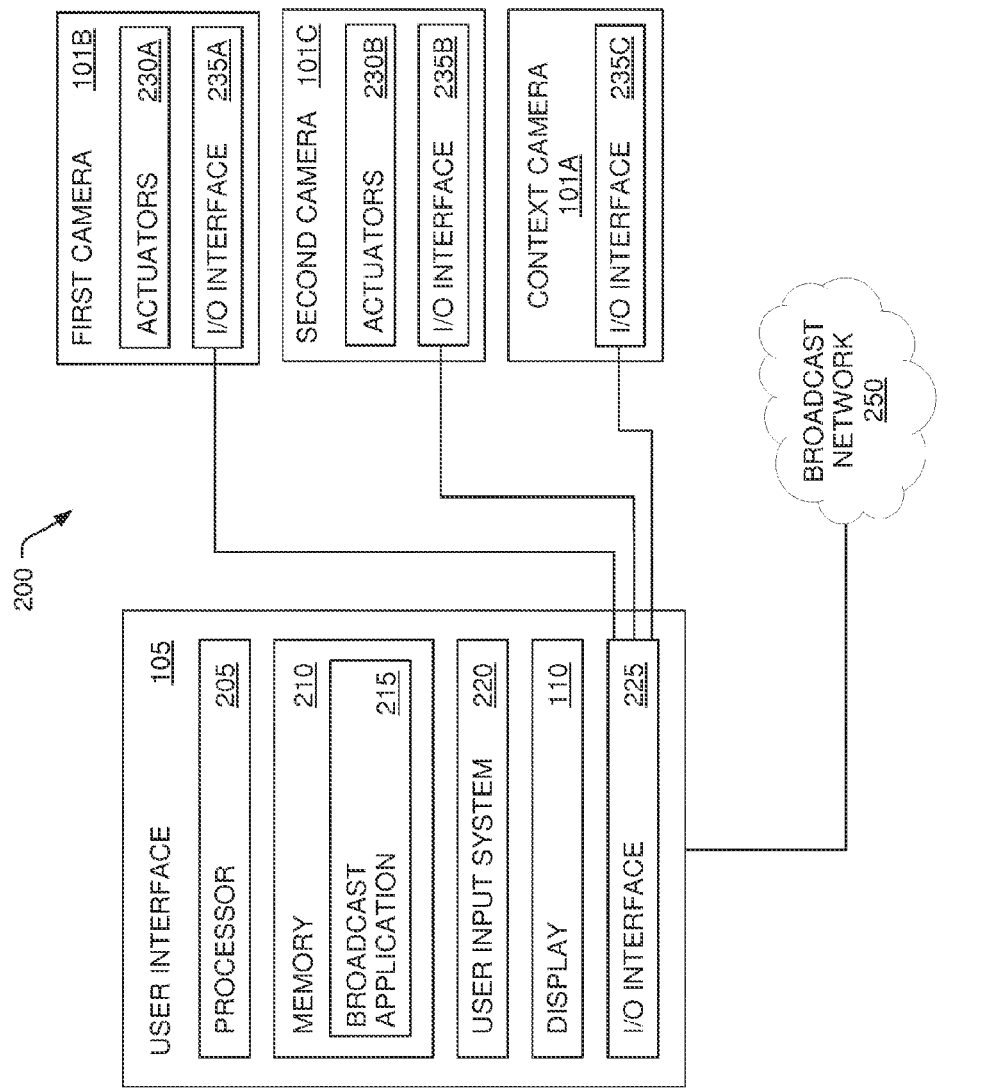
FIG. 2 illustrates a block diagram of a system for controlling multiple cameras using a user interface, according to one embodiment presented herein.

FIG. 2 illustrates a block diagram of a system 200 for controlling multiple cameras 100 using the user interface 105, according to one embodiment presented herein. System 200 includes the user interface 105, cameras 101, and the broadcast network 250. The user interface 105, which may be any computing device (e.g., tablet, laptop, desktop system, smart phone, and the like), includes a processor 205 capable of performing the functions described herein. The processor 205 represents any number of general-purpose or specially-designed processing elements. The user interface 105 also includes a memory 210 which may include volatile or non-volatile memory elements. The memory 210 stores a broadcast application 215 which includes logic for permitting the user to generate the media presentation using the images captured by the cameras 101. For example, when executed by processor 205, the broadcast application 215 superimposes one of the views of the first or second cameras 101B and 101C onto the image of the context camera 101A and permits the user to control the cameras 101B and 101C to generate the desired media presentation that may be broadcasted on the broadcast network 250 (e.g., a TV broadcast or Internet broadcast). Alternatively, the user interface 105 may store the presentation onto media such as a DVD, CD, hard disk, etc.

The user interface 105 includes a user input system 220 that permits a user to generate instructions which are then interpreted by the broadcast application 215. The input system 220 may be a standalone device such as a joystick, controller, mouse, and the like or may be integrated with other components in the user interface 105 such as a touch sensing system (capacitive or resistive) that uses the display 110 to create a touch sensing region. Furthermore, the input system 220 may not require any physical interaction between the user and the user interface 105. For example, the system 220 may include a voice recognition application that works with a microphone to allow the user to input vocal commands which are interpreted by the broadcast application 215. Of course, the user input system 220 may include a combination of the various techniques discussed above. For instance, the system 220 may include a switching device (e.g., a switching panel) for switching between the different views of the first and second cameras 101B and 101C and a touch sensing system integrated into the display 110 for adjusting the view of the controllable cameras 101B and 101C.

The display 110 may be an integrated display screen such as a tablet or laptop or may be a standalone display such as a monitor. The display 110 may use any display technology such as LED, LCD, CRT, plasma, OLED, and the like.

The user interface 105 includes an I/O interface 225 that is communicatively coupled to the cameras 101 and the broadcast network 250. The I/O interface 225 may be a wired interface, wireless interface, or some mixture of both. Although not shown, instead of having a direct connection to the cameras 101, the I/O interface 225 may rely on a local or wide access network to receive image data from, and transmit user instructions to, the cameras 101. Similarly, instead of transmitting the captured media presentation to the network 250, the interface 225 may be coupled directly to a display device. In one embodiment, the user interface 105 stores the presentation locally—e.g., in memory 210—rather than transfer the media presentation to a remote network or display device.

The first and second cameras 101B and 101C includes respective actuators 230A and 230B that permit the cameras to move in one or more degrees-of-freedom—e.g., pan, tilt, or zoom—thereby adjusting the image captured by the cameras 101B and 101C. To do so, the broadcast application 215 send commands to I/O interfaces 235A and 235B which forward the commands to the actuators 230 which change the viewing area as instructed by the user. In addition to receiving commands, the I/O interfaces 235 may continually send image data (e.g., a plurality of image frames) to the user interface 105 which are used by the broadcast application 215 to update the scene presented on the display 110. Although two controllable cameras are shown, the system 200 may include any number of cameras.

In one embodiment, the context camera 101A is a wide-angle camera such as a fish eye. Alternatively, system 200 may include a plurality of context cameras whose outputs are used to generate a mosaic of images that are then merged to form the wide-angle context view presented on display 110. Although in one embodiment the context camera 101A may not be adjusted when the media presentation is being produced, the user may initially adjust the context camera 101A so that its field of view captures the entire event. For example, to broadcast a basketball game, the system 200 may include a fish eye lens that captures the entire length of the basketball court. But if the user desires to include in the broadcast images of fans in the stands, the user may increase the viewable area of the context view by using a wider-angle fish eye lens or by adding additional context cameras whose outputs are merged to generate the context view. In this manner, the viewable area captured by the context view may be increased or decreased as desired. Using the I/O interface 235C, the context camera 101A transmits the context view to the user interface 105 for display.

In one embodiment, the field of view of the context camera 101A may define all the possible views that can be used to generate the media presentation. That is, the views of the cameras 101B and 101C used to generate the media presentation may not exceed the field of view of the context camera 101A. Nonetheless, the user may move the fields of view of the cameras 101B and 101C anywhere within the boundaries of the context view. In another embodiment, however, the user may readjust the field of view of the context camera 101A while generating the media presentation although this may require some recalibration based on the current pan or tilt position of the context camera to ensure the views captured by the cameras 101B and 101C can be superimposed onto the context view.

Figure 3:
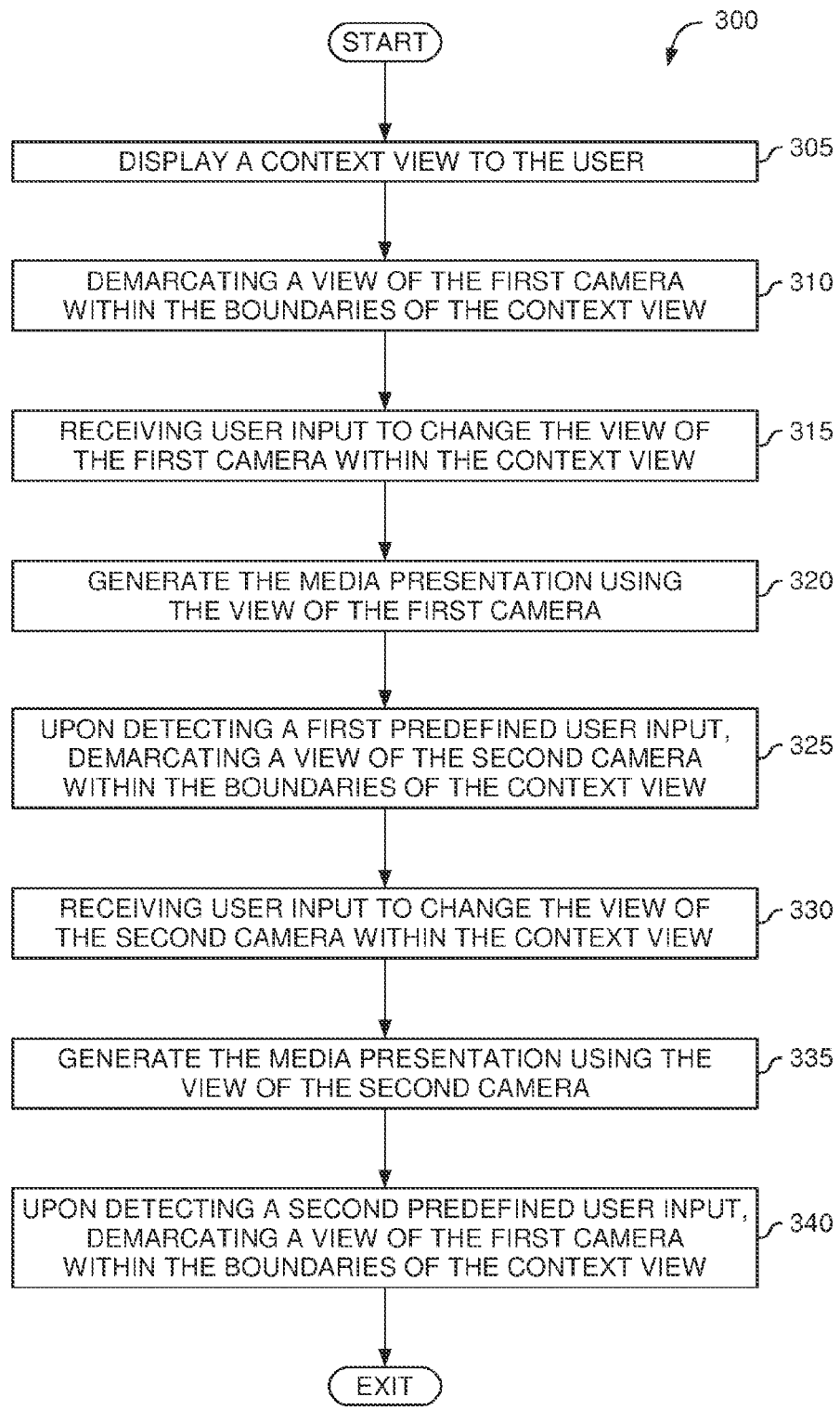
FIG. 3 illustrates a method for switching between and controlling multiple cameras for generating a media presentation, according to one embodiment presented herein.

FIG. 3 illustrates a method 300 for switching between and controlling multiple cameras for generating the media presentation, according to one embodiment presented herein. At block 305, the user interface presents the context view using a display as discussed above. The context view may take up all of the viewable area of the display or only a portion thereof. For example, a side portion of the display may be reserved for other functions such as displaying statistical data, providing touch-activated buttons, and the like.

Figure 4A:
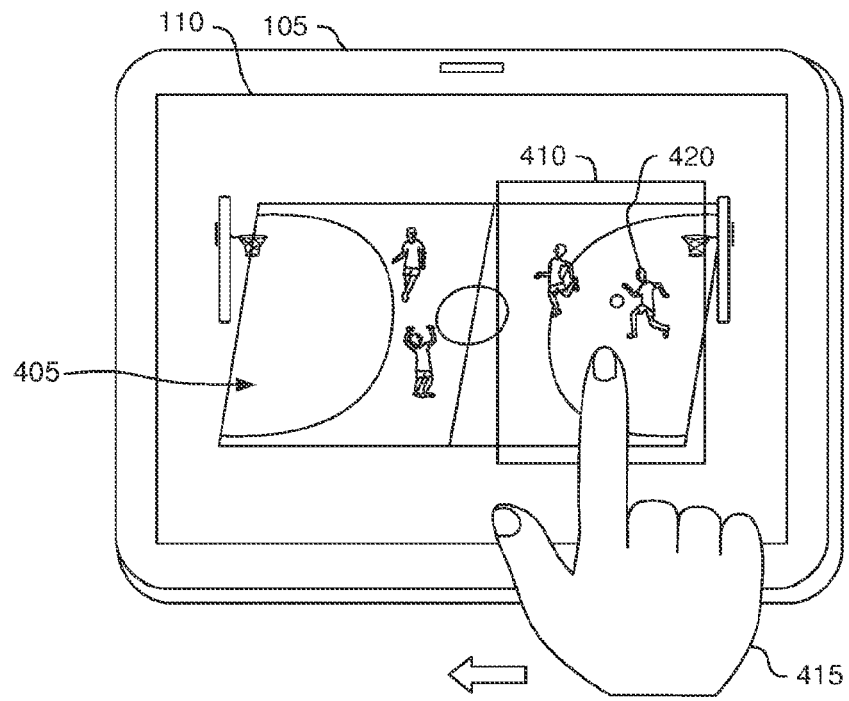
FIGS. 4A-4E illustrate techniques for switching between and controlling multiple cameras for generating the media presentation, according to embodiments presented herein.

At block 310, the user interface superimposes a view of the first camera within the boundaries of the context view. To provide a more detailed explanation, FIGS. 4A-4E will be discussed in conjunction of the blocks of method 300. FIGS. 4A-4E illustrate techniques for switching between and controlling multiple cameras for generating the media presentation, according to embodiments presented herein. Specifically, FIG. 4A illustrates a boundary 410 in the displayed context view 405 that represents the field of view of the first camera (not shown). In one embodiment, the boundary 410 may use a display scheme that distinguishes the view of the first camera from the rest of the context view 405. Doing so may enable the user to easily determine the view of the first camera on the display 110. For example, the boundary 410 may be a bright color (e.g., a neon color) or use a thick border. Alternatively, the boundary 410 may blink or flash to attract the user's attention.

Figure 4B:
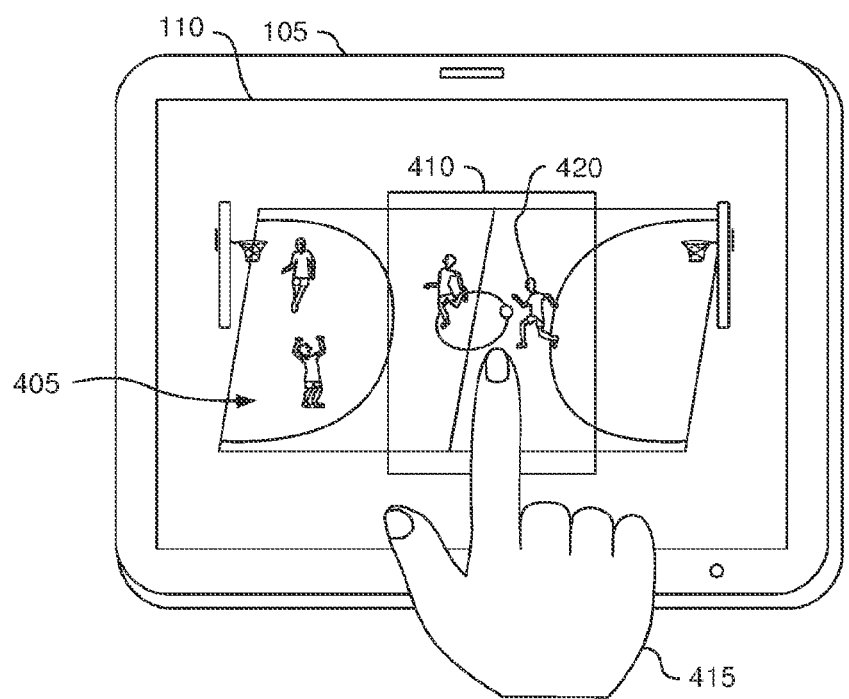

Returning to method 300, at block 315, the user interface may receive user input to change the view of the first camera within the context view. Using FIG. 4A as an example, the user interface 105 may be configured to respond to the motion of the user's finger 415. The display 110 may be a touch screen that permits the user interface 105 to detect the location of the finger 415 on (or near) the display 110. Based on the interaction between the user and the display 110, the user interface may update the view of the first camera. As shown here, the user slides the finger 415 across the display from right to left. FIG. 4B illustrates the result of the sliding motion where the boundary 410 has moved to cover a different portion of the context view 405. In this scenario, the context view captures the action of a basketball game. In order to follow the player 420 who is dribbling the basketball up the court, the user slides his finger to keep the player 420 within the boundaries of the boundary 410—i.e., the view of the first camera. Specifically, as the user moves her finger 415, the user interface 105 sends corresponding commands to the actuators of the first camera that move its field of view to encompass the desired portion of the context view.

Although a dragging motion is shown for changing the boundary 410 (thereby changing the view of the first camera), this is just one suitable user action. In another example, the user action may be the user touching a particular location on the display 110 which is outside of the boundary 410 which causes the boundary 410 to center at the point of the user contact. Or the user may touch any portion of the display, regardless if the point is outside the boundary 410, thereby causing the boundary 410 to center at the point. Further still, instead of using a touch sensitive display, the user interface 105 may include a user input device such as a joystick or mouse that enable the user to move the boundary 410 and change the view of the first camera. For example, using a displayed cursor, the user may grab and move the boundary 410 to a desired location in the context view 405.

In one embodiment, the boundary 410 may be limited to the boundary of the context view 405. For example, the user interface 105 may not permit the user to move the view of the first camera outside of the context view 405. Stated differently, the boundary 410 cannot be moved beyond the boundaries of the context view 405. Doing so may ensure the user does not inadvertently broadcast images outside of the context view 405 that she cannot see. However, in another embodiment, the user may be able to move the boundary 410 such that some portion of the boundary 410 is outside of the context view 405. In this situation, the view of the first camera is not completely within the context view, and thus, the first camera detects image data that is outside of the context view 405 which the user may not be able to see using display 110.

Returning to method 300, at block 320 the user interface uses the current view of the first camera to generate the media presentation. For instance, the view of the first camera is broadcast to other display devices using a suitable broadcast network described above. As shown in FIG. 4A, only the portion of the context view 405 within the boundary 410 is used to generate the media presentation. The rest of the context view 405 is not. However, the portion of the context view 405 that is not broadcast is still useful since the user can view the entire context view 405 to determine if the view of the first camera should be moved to a different location. Using the finger 415 as shown in FIG. 4A and 4B, the user can change the view of the first camera thereby determining what image data is used to produce the media presentation. Stated differently, even as the user moves the boundary 410, whatever image is encapsulated in the boundary 410 is used as the media presentation.

Figure 4C:
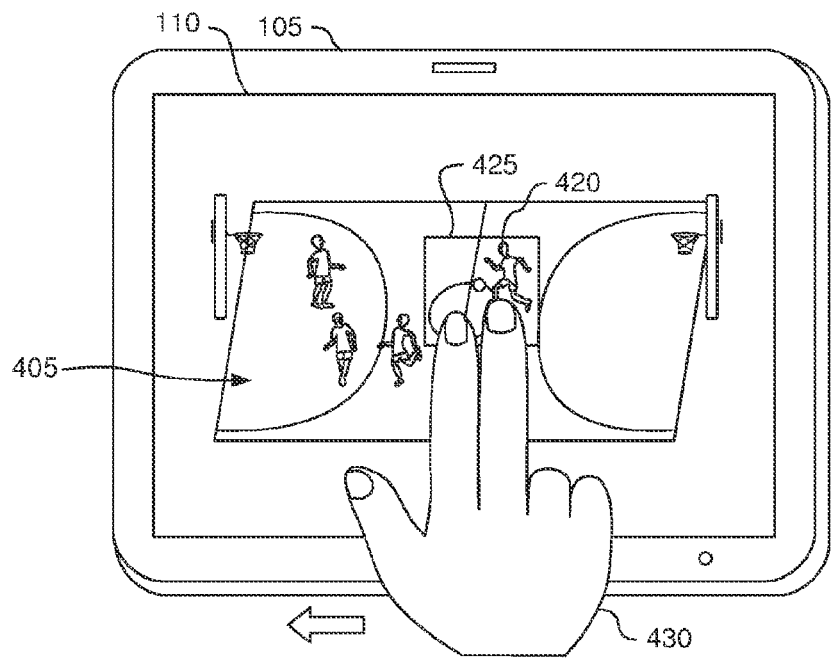

At block 325 of method 300, the user interface demarcates a view of the second camera within the boundaries of the context view upon detecting a first predefined user input. FIG. 4C illustrates one example of a user instruction that directs the user interface 105 to demarcate the view of the second camera rather than the first camera onto the context view 405. As shown here, the user may press two fingers 430 against the display 110 to indicate when the view of the second camera should be displayed. Upon doing so, the user interface 105 displays a new boundary 425 which corresponds to the field of view of the second camera. The second camera may offer a different perspective than the first camera. For example, the first camera may be a game camera that is used to capture the general action of the event while the second camera is an iso-camera used to capture close-up shots. For instance, as the player 420 dribbles up to the half court line as shown in FIGS. 4A and 4B, the user may use the first camera (e.g., the game camera) to show how the teams are setting up their respective defensive or offensive schemes. However, after the player 420 crosses the half court line, the user may switch to the second camera (e.g., the iso-camera) as shown in FIG. 4C to provide a more detailed view (e.g., a zoomed in view) of player 420 as she decides either to continue to dribble the ball or pass to another player.

Figure 4D:
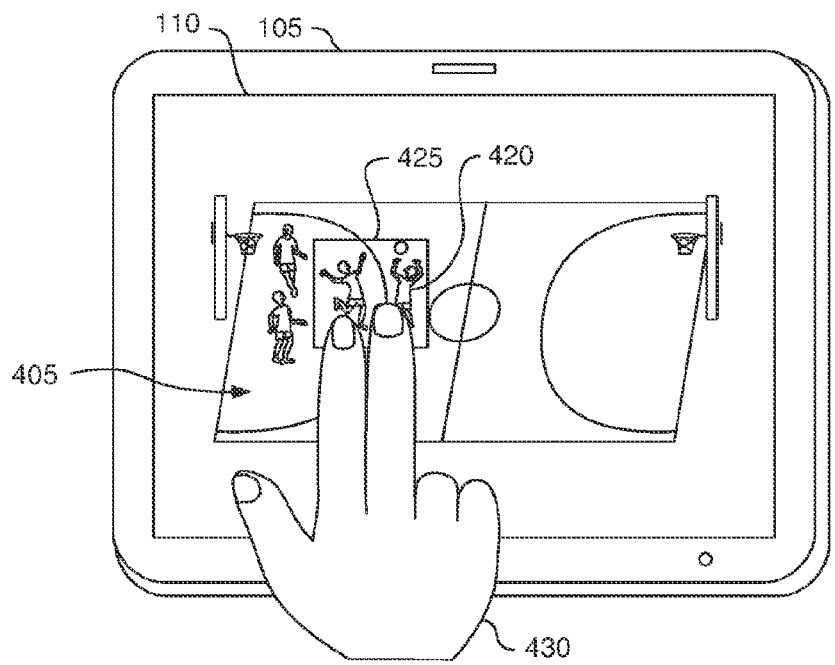

At block 330 of method 300, the user interface changes the view of the second camera within the context view based on user input. As shown by the arrow in FIG. 4C, the user may drag her fingers across the display 110 which moves the boundary 425 to a different location within the context view 405 as shown by FIG. 4D. In one embodiment, the boundary 425 may be centered at the two points of contact made by the user's digits 430. Alternatively, the user interface 105 may use the points of contact made by the user's digits 430 to define the location of the lower side of the boundary 425. Doing so may keep the user's digits 430 from blocking the displayed action in the boundary 425.

As discussed in step 315, other techniques besides dragging the user's fingers for changing the view of the selected camera are possible. For example, the user may tap the screen in order to move the boundary 425 or use a different input device to change the camera's view—e.g., a track pad, joystick, mouse, and the like.

At block 335, the user interface uses the view of the second camera to generate the media presentation. For instance, the user interface may broadcast the images captured by the second camera to generate a live broadcast of an event. Thus, instead of seeing the view of the first camera, the viewer of the live broadcast sees the view captured by the second camera as shown in FIGS. 4C and 4D.

In one embodiment, the user interface may automatically switch from using the first camera to using the second camera to generate the media presentation once the user instructs the interface to demarcate the view of the second camera at step 325. That is, once the user places two fingers onto the touch screen thereby demarcating the view of the second camera onto the display screen 110 as shown in FIG. 4C, the user interface 105 also switches from using the view of the first camera to using the view of the second camera to generate the media presentation. Alternatively, the user interface may wait until receiving another instruction for the user before using the view of the second camera to generate the media presentation. For instance, when the user instructs the user interface 105 to display the boundary 425 corresponding to the second camera as shown in FIG. 4C, the interface 105 may continue to generate the media presentation using the first camera. However, after the user has moved the view of the second camera as shown in FIG. 4D, the user may provide a different instruction to the user interface 105 (e.g., by tapping the display 110 or providing a voice command) to begin using the view of the second camera to generate the media presentation.

Figure 4E:
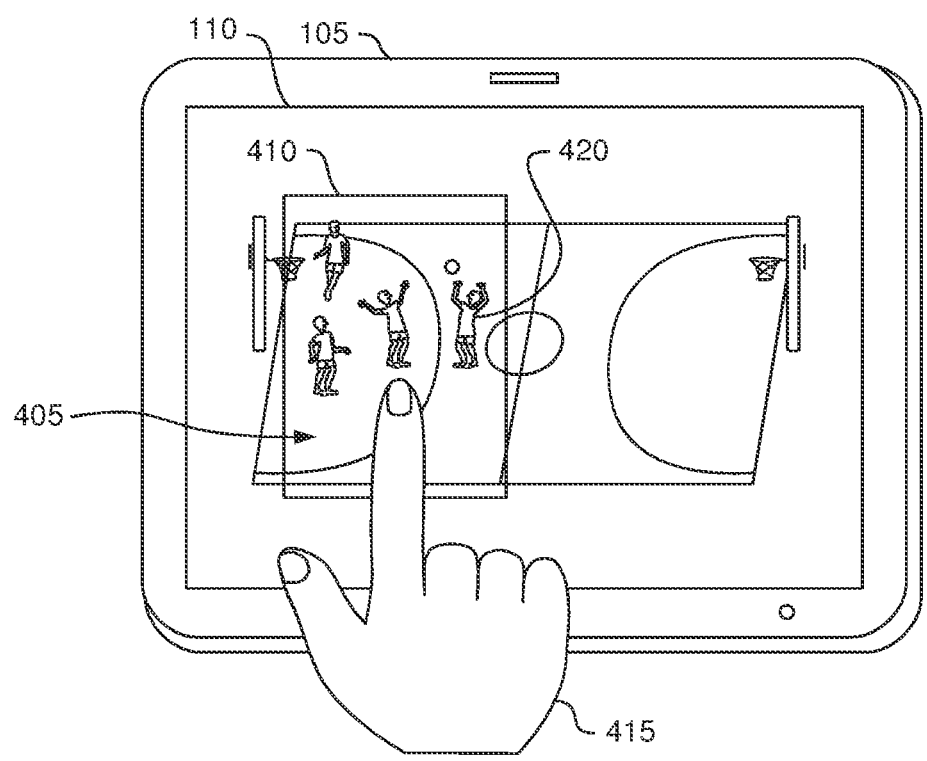

At block 340 of method 300, upon detecting a second predefined user input, the user interface 105 again displays the view of the first camera onto the view captured by the context camera as illustrated in FIG. 4E by boundary 410. Although FIGS. 4A-4E illustrate that the first and second predefined user inputs are either one or two fingers contacting the touch screen 110, this is just one suitable example. Alternatively, the user may use single or double taps on the screen to switch between the two controllable camera views. Instead of use a touch screen, in another embodiment, the user may switch between the first and second cameras using an input device such as a mouse, joystick, switch, and the like. For example, the user may use one of her hands to move the boundaries 410 and 425 on the touch sensitive screen 110 and use her second hand to switch between controlling the first and second cameras using buttons on the interface 105. Further still, the user could use one or more voice commands to switch between the first and second cameras. In this manner, the first and second predefined user input used to switch between which cameras view is currently demarcated in the display 110 may be any predefined user command that is detectable by the user interface 105.

In one embodiment, the second predefined user input may also indicate to the user interface 105 to switch back from using the view of the second camera to using the view of the first camera to generate the media presentation. As shown in FIG. 4E, the player 420 has shot the basketball and the user may wish to zoom out to see how the other players react (e.g., whether the players position for a rebound or begin running to the other end of the court). Once the user switches between the views, the user interface 105 may either begin generating the media presentation using the currently selected camera or wait for a different command before using the view of the first camera in the media presentation as discussed above.

In addition to providing tools for the user to control the first and second cameras, the user interface 105 may independently or automatically move the first and second cameras. That is, while the user is controlling the view of one of the cameras (i.e., the selected camera), the user interface 105 may be controlling the view of the other camera (i.e., the inactive camera). In one embodiment, the user interface 105 may control the inactive camera based on the user movements of the selected camera. For instance, the user interface 105 may keep the views of the two cameras centered. As shown in FIG. 4B, the view of the first camera is at approximately mid-court before the user switches over to the view of the second camera in FIG. 4C. As the user moves the view of the second camera as shown by FIGS. 4C and 4D, the user interface 105 may make similar changes to the view of the first camera although this is not shown on the display screen 110. Specifically, the user interface 105 may send commands to the actuators of the first camera that correspond to commands sent to the actuators of the second camera in order to keep the two views centered or aligned. Thus, when the user switches back to the view of the first camera at FIG. 4D by removing one of her digits, the view of the first camera is already substantially centered on the user digit 415. That is, the user interface 105 has used the adjustments made to the second camera to also move the first camera without requiring further user input—i.e., the view of the first camera was moved from what is shown in FIG. 4A to what is shown in FIG. 4E without explicit direction from the user.

In other embodiments, the user interface 105 may use other criteria for controlling the inactive camera (or cameras). To do so, the interface 105 may include a tracking application that permits the user interface 105 to track objects captured by the cameras. For instance, the tracking application may track a location of the basketball or a particular player within the context view. Based on this location, the user interface 105 may control the inactive camera. For example, the user may move the view of the first camera to follow the player with the basketball while at the same time the user interface 105 moves the inactive second camera to follow a particular player (e.g., the team's best player who does not currently have the ball). In this manner, the user can quickly switch to view of the star player without having to move the view of the first camera by simply switching to the view of the second camera. Doing so may enhance the viewer's experience by reducing the time needed to switch between desired views (e.g., the view of the basketball and the view of the star player). Once the user switches to the second camera, the user interface 105 may then continue to adjust the view of the now inactive first camera to track the basketball so that the user can quickly switch back to its view.

In other embodiments, the user interface 105 may enable the user to control more than just two cameras. For example, a third camera may be selectively controlled by the user to generate the media presentation. The third camera may be used to track a coach on the side of the court or to capture images of the crowd. Here, the tracking application may use facial recognition techniques to maintain the view of the third camera centered on the coach or people within the crowd. Thus, when desired, the user can instruct the user interface to highlight the view of the third camera within the context view to generate the media presentation. In this scenario, the user interface 105 may define three predefined user inputs for switching between the multiple controllable cameras.

In one embodiment, the user interface 105 may provide suggestions to the user to switch between the controllable cameras. After a player has made an important shot, the crowd may have jumped to their feet. As such, the user interface 105 may determine that the view of a camera focused on the crowd is detecting a significant amount of motion caused by the excited crowd. The user interface 105 may display a prompt using the display screen 110 to switch to the crowd camera. In response, the user may choose to switch to the view of the crowd camera so that its view is used to generate the media presentation.

The user interface 105 may provide what are referred to herein as "burn-ins" that are overlaid the camera views used to generate the media presentation. The burn-ins provide additional information related to live event such as game statistics, advertisements, promotions, and the like. For example, when a player scores a basket, the user interface 105 may either automatically, or via prompt from the user, provide a burn-in displaying the player's score card for the game (e.g., the number of shots attempted versus shots made, rebounds, assists, etc.). To incorporate the burn-in into the media presentation, the user interface superimposes the burn-in over a portion of the images captured by the cameras (e.g., the bottom of the images).

Figure 5:
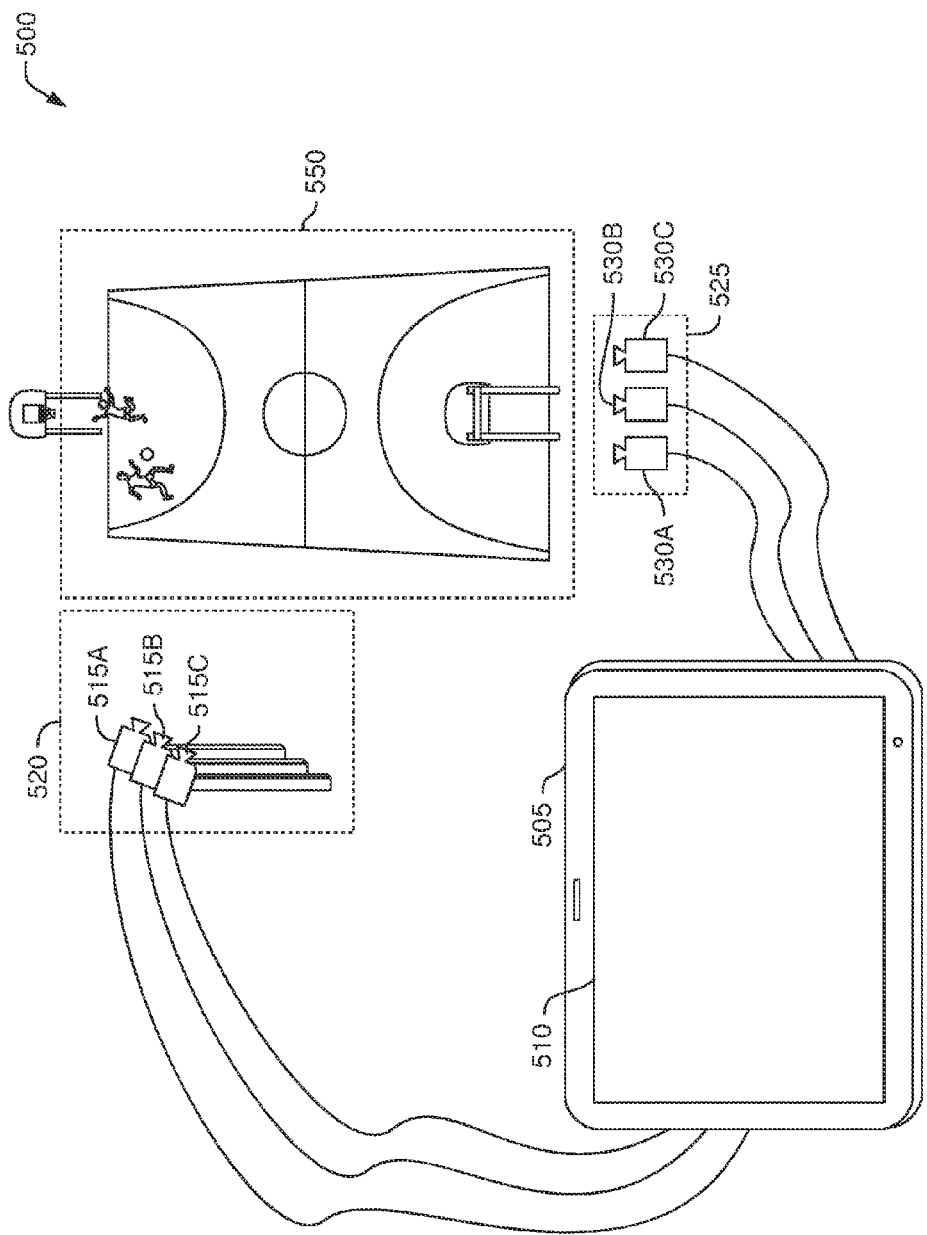
FIG. 5 illustrates a system for controlling multiple camera sets at multiple vantage points using the user interface, according to one embodiment presented herein.

FIG. 5 illustrates a system 500 for controlling multiple camera sets at multiple vantage points using a user interface 505, according to one embodiment presented herein. As shown, system 500 includes two different sets of cameras, set 520 and set 525. In one embodiment, each set includes a context camera (e.g., 515A) and at least two controllable cameras (e.g., 515B and 515C). Each camera within in the sets 520, 525 may share substantially the same vantage point so that the images of the controllable cameras can be superimposed onto the images captured by the context camera as described above. Nonetheless, the two sets of cameras 520, 525 may have different vantage points of the event 550. Doing so offers different perspectives that may enhance the viewer's experience.

The user may control each set of cameras 520, 525 using the techniques described in the previous figures and embodiments. For example, using the interface 105, the user may switch between the views of cameras 515B and 515C with the context view captured by camera 515A in order to generate the media presentation. That is, the camera set 520 may be controlled as discussed using method 300 of FIG. 3. Additionally, the user may switch to controlling the camera set 525. For instance, the user may make a swiping gesture on a touch-sensitive display 510 which causes the user interface 505 to display the context view from the context camera in set 525—e.g., camera 530A. Instead of using a touch sensitive display screen, the user interface may include any number of user input devices for enabling the user to switch between the camera sets 520 and 525. For example, the user interface 105 may include a plurality of buttons that each correspond to one of the sets 520 and 525 that are coupled to a connection interface of the user interface 105. Further still, the user interface 505 may detect voice commands from the user for switching between the different sets 520, 525.

Because set 525 has a different vantage point than set 520, the respective context views will also be different. For example, the cameras in set 525 may be mounted on a backboard while the cameras in set 520 may be located on the side of the event 550. Thus, when shooting a free throw, the user may switch from set 520 to set 525. When switching between sets, the user interface 505 may automatically select one of the controllable cameras 530B or 530C as the active camera which the user adjusts using the interface 105. The user may then instruct the user interface 505 to change the views of the two controllable cameras 530B and 530C with the context view captured by camera 530A as discussed in method 300 of FIG. 3. In this manner, the user interface 505 may be coupled to any number of sets of context/controllable cameras that provide different vantage points of the event. Doing so enables a single user to efficiently switch between the vantage points to generate the media presentation using the user interface 505.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:
1. A method, comprising:
displaying a context video stream of a live event on a screen, wherein the context video stream is captured by a context camera;
superimposing a video stream of the live event captured by a first camera on the context video stream in the screen, wherein the video stream captured by the first camera is a first sub-portion of the context video stream and is marked by displaying a first visual demarcation in the context video stream;
transmitting, based on received user input, a command to adjust the video stream captured by the first camera, thereby moving the first sub-portion corresponding to the video stream captured by the first camera to a different location within the context video stream, wherein the first visual demarcation moves to the different location;
superimposing a video stream of the live event captured by a second camera on the context video stream, wherein the video stream captured by the second camera is a second sub-portion of the context video stream;

upon receiving a predefined user input to switch from the video stream captured by the first camera to the video stream captured by the second camera, removing the first visual demarcation of the first sub-portion in the context video stream and displaying a second visual demarcation for the second sub-portion in the context video stream on the screen; and outputting the first and second sub-portions to generate a media presentation of the live event, wherein the first and second visual demarcations indicate which one of the first and second sub-portions of the context video stream is currently being used to generate the media presentation.

2. The method of claim 1, further comprising:

upon determining that the second sub-portion is visually demarcated on the screen, transmitting, based on received user input, a different command to adjust the video stream captured by the second camera, thereby moving the second sub-portion corresponding to the video stream captured by the second camera to a different location in the context video stream.

3. The method of claim 1, wherein displaying the first and second visual demarcations comprises displaying respective boundaries around the first and second sub-portions to visually distinguish the first and second sub-portion from a rest of the context video stream.

4. The method of claim 1, further comprising, upon receiving the predefined user input:

ceasing to output the first sub-portion to generate the media presentation; and beginning to output the second sub-portion to generate the media presentation.

5. The method of claim 1, wherein the first, second, and context cameras are located proximate to each other and share substantially the same vantage point of the live event.

6. The method of claim 1, further comprising:

while the first sub-portion is visually demarcated on the screen and the second sub-portion is not visually demarcated on the screen, transmitting, without user input, a different command to the second camera to adjust the video stream captured by the second camera, thereby moving the second sub-portion corresponding to the video stream captured by the second camera to a different location in the context video stream.

7. The method of claim 1, further comprising:

switching, based on received user input, to a different context video stream of the live event captured from a different vantage point than a vantage point associated with the first and second cameras;

visually demarcating a third sub-portion of the different context video stream displayed on the screen, the third sub-portion corresponding to a video stream captured by one of a third camera and a fourth camera; and transmitting, based on received user input, a command to adjust the video stream captured by one of the third and fourth cameras, thereby moving the third sub-portion to a different location within the different context video stream.

8. A computer program product for generating a media presentation, the computer program product comprising:

a non-transitory computer-readable storage medium having computer-readable program code embodied therewith, the computer-readable program code comprising computer-readable program code configured to:

display a context video stream of a live event on a screen, wherein the context video stream is captured by a context camera;

superimpose a video stream of the live event captured by a first camera on the context video stream in the screen, wherein the video stream captured by the first camera is a first sub-portion of the context video stream and is marked by displaying a first visual demarcation in the context video stream;

transmit, based on received user input, a command to adjust the video stream captured by the first camera, thereby moving the first sub-portion corresponding to the video stream captured by the first camera to a different location within the context video stream, wherein the first visual demarcation moves to the different location;

superimpose a video stream of the live event captured by a second camera on the context video stream, wherein the video stream captured by the second camera is a second sub-portion of the context video stream;

upon receiving a predefined user input to switch from the video stream captured by the first camera to the video stream captured by the second camera, remove the first visual demarcation of the first sub-portion in the context video stream and displaying a second visual demarcation for the second sub-portion in the context video stream on the screen; and output the first and second sub-portions to generate the media presentation of the live event, wherein the first and second visual demarcations indicate which one of the first and second sub-portions of the context video stream is currently being used to generate the media presentation.

9. The computer program product of claim 8, further comprising computer-readable program code configured to, upon determining that the second sub-portion is visually demarcated on the screen, transmit, based on received user input, a different command to adjust the video stream captured by the second camera, thereby moving the second sub-portion corresponding to the video stream captured by the second camera to a different location in the context video stream.

10. The computer program product of claim 8, further comprising computer-readable program code configured to, upon receiving the predefined user input:

ceasing to output the first sub-portion to generate the media presentation; and beginning to output the second sub-portion to generate the media presentation.

11. The computer program product of claim 8, wherein outputting the first and second sub-portions to generate the media presentation comprises transmitting the first and second sub-portions to a broadcast network configured to broadcast the media presentation to a plurality of viewers.

12. The computer program product of claim 8, further comprising computer-readable program code configured to:

switch, based on received user input, to a different context video stream of the live event captured from a different vantage point than a vantage point associated with the first and second cameras;

visually demarcate a third sub-portion of the different context video stream displayed on the screen, the third sub-portion corresponding to a video stream captured by one of a third camera and a fourth camera;

transmit, based on received user input, a command to adjust the video stream captured by one of the third and fourth cameras, thereby moving the third sub-portion to a different location within the different context video stream.

13. A user interface, comprising:
a connection interface configured to couple to a first controllable camera, a second controllable camera, and a context camera;
a display screen; and
a processing element configured to:
receive and display a context video stream captured by the context camera of a live event on the display screen;
superimpose a video stream of the live event captured by the first camera on the context video stream in the screen, wherein the video stream captured by the first camera is a first sub-portion of the context video stream;
mark the first sub-portion by displaying a first visual demarcation in the context video stream;
transmit, based on received user input, a command to the first camera to adjust the video stream captured by the first camera, thereby moving the first sub-portion corresponding to the video stream captured by the first camera to a different location within the context video stream, wherein the first visual demarcation moves to the different location;
superimpose a video stream of the live event captured by the second camera to the context video stream, wherein the video stream captured by the second camera is a second sub-portion of the context video stream;
upon receiving a predefined user input to switch from the video stream captured by the first camera to the video stream captured by the second camera, remove the first visual demarcation of the first sub-portion in the context video stream and display a second visual demarcation for the second sub-portion in the context video stream on the display screen; and
output the first and second sub-portions to generate a media presentation of the live event, wherein the first and second visual demarcations indicate which one of the first and second sub-portions of the context video stream is currently being used to generate the media presentation.

14. The user interface of claim 13, wherein the processing element is further configured to:
upon determining that the second sub-portion is visually demarcated on the screen, transmit, based on received user input, a different command to the second camera to adjust the video stream captured by the second camera, thereby moving the second sub-portion corresponding to the video stream captured by the second camera to a different location in the context video stream.

15. The user interface of claim 13, wherein the processing element is further configured to upon receiving the predefined user input:
cease to output the first sub-portion to generate the media presentation; and
begin to output the second sub-portion to generate the media presentation.

16. The user interface of claim 13, wherein the connection interface is configured to couple to a third controllable camera, a fourth controllable camera, and a different context camera, the processing element is configured to:
switch from displaying the context video stream captured by the context camera to displaying a different context video stream captured by the different context camera, wherein one of a video stream of the third camera and a video stream of the fourth camera is visually demarcated within the different context video stream on the display screen.

17. The user interface of claim 13, wherein the first, second, and context cameras share a first vantage point of the live event and the third, fourth, and different context cameras share a second, different vantage point of the live event.

18. The method of claim 1, further comprising:
while the first sub-portion is visually demarcated on the screen and the second sub-portion is not visually demarcated on the screen, simultaneously transmitting commands to move the first sub-portion corresponding to the video stream captured by the first camera and move the second sub-portion corresponding to the video stream captured by the second camera to keep the video streams captured by the first and second cameras centered at a common point.

19. The computer program product of claim 8, further comprising computer-readable program code configured to:
while the first sub-portion is visually demarcated on the screen and the second sub-portion is not visually demarcated on the screen, simultaneously transmit commands to move the first sub-portion corresponding to the video stream captured by the first camera and move the second sub-portion corresponding to the video stream captured by the second camera to keep the video streams captured by the first and second cameras centered at a common point.

20. The user interface of claim 13, wherein the processing element is further configured to:
while the first sub-portion is visually demarcated on the screen and the second sub-portion is not visually demarcated on the screen, simultaneously transmit commands to move the first sub-portion corresponding to the video stream captured by the first camera and move the second sub-portion corresponding to the video stream captured by the second camera to keep the video streams captured by the first and second cameras centered at a common point.

* * * * *